US012492803B2

(12) United States Patent
Walters

(10) Patent No.: US 12,492,803 B2
(45) Date of Patent: Dec. 9, 2025

(54) SILICONE LENSING FOR AESTHETIC AUTOMOTIVE TRIM LIGHTING

(71) Applicant: Lacks Enterprises, Inc., Grand Rapids, MI (US)

(72) Inventor: Dave Walters, Shelbyville, MI (US)

(73) Assignee: Lacks Enterprises, Inc.

(*) Notice: Subject to any disclaimer, the term of this patent is extended or adjusted under 35 U.S.C. 154(b) by 0 days.

(21) Appl. No.: 18/479,232

(22) Filed: Oct. 2, 2023

(65) Prior Publication Data

US 2024/0110688 A1 Apr. 4, 2024

Related U.S. Application Data

(60) Provisional application No. 63/412,608, filed on Oct. 3, 2022.

(51) Int. Cl.

| | |
|---|---|
| ***F21V 5/04*** | (2006.01) |
| ***F21K 9/90*** | (2016.01) |
| ***F21V 3/10*** | (2018.01) |
| ***F21V 17/12*** | (2006.01) |
| *F21W 104/00* | (2018.01) |
| *F21Y 103/10* | (2016.01) |
| *F21Y 105/18* | (2016.01) |
| *F21Y 115/10* | (2016.01) |

(52) U.S. Cl.

CPC ................ *F21V 5/045* (2013.01); *F21K 9/90* (2013.01); *F21V 3/10* (2018.02); *F21V 17/12* (2013.01); *F21W 2104/00* (2018.01); *F21Y 2103/10* (2016.08); *F21Y 2105/18* (2016.08); *F21Y 2115/10* (2016.08)

(58) Field of Classification Search

CPC . F21V 17/12; F21V 5/045; F21V 3/10; F21K 9/90

See application file for complete search history.

(56) References Cited

U.S. PATENT DOCUMENTS

| | | | | |
|---|---|---|---|---|
| 7,507,924 | B2 * | 3/2009 | Lorenzo Riera | H01H 13/023 200/341 |
| 9,739,426 | B2 * | 8/2017 | Hoechtl | F21V 3/00 |
| 10,759,339 | B2 * | 9/2020 | Ammar | F21V 5/04 |
| 11,519,585 | B2 * | 12/2022 | Negel | F21V 23/0485 |
| 12,083,948 | B2 * | 9/2024 | Tao | F21S 43/26411 |
| 2007/0091598 | A1 * | 4/2007 | Chen | F21V 29/00 362/249.02 |
| 2010/0084959 | A1 * | 4/2010 | Nam | F21S 4/10 313/116 |

* cited by examiner

*Primary Examiner* — Christopher E Dunay
(74) *Attorney, Agent, or Firm* — Dickinson Wright PLLC

(57) ABSTRACT

A decorative component for an automobile includes a carrier, a light source, a lens, and a cover. The lens is made of silicone material that is UV resistant, and does not include a UV resistant hardcoat. The silicone lens is flexible and covers the light source, and also seals against the carrier structure. The cover is sized to cover a portion of the lens, leaving an uncovered portion of the lens from which light from the light source will be transmitted and made visible. The lens may be formed by reactive injection molding, including a liquid silicone resin with low viscosity, such that the liquid silicone resin reaches small crevices within the mold cavity. A surface of the mold may include fine detail engraving, replicated in the formed solid of the lens, which may provide aesthetic features and/or light diffusion. The silicone resin may also include a diffusion agent.

20 Claims, 5 Drawing Sheets

SILICONE LENSING FOR AESTHETIC AUTOMOTIVE TRIM LIGHTING

FIELD

The present disclosure is directed to a decorative component for automotive applications. More particularly, the present disclosure is directed to a decorative component having a UV resistant lighting feature.

BACKGROUND

There is an increasing demand for lighting fixtures in interior and exterior automotive applications to meet the requirements of new and more complicated designs. The automotive industry is incorporating increasingly complicated designs involving the use of molded plastic components of different materials to achieve a multi-functional purpose. Decorative components, such as decorative components disposed on automotive products in one example, are typically used to add an aesthetic feature to appeal to a variety of tastes of potential consumers. Consumer decisions on whether to buy one particular product, such as an automobile, relative to another can be substantially affected by appearance, especially in cases of similarly functioning products.

Currently, demands in the automotive market space can be met via multi-shot injection or overmolding, or assembly of separate pieces to a common carrier, that incorporate transparent or translucent zones, in combination with opaque finished plastic surfaces. Such approaches may provide the ability to illuminate parts selectively, such that portions of the component are illuminated.

In one approach, injection molded plastic, such as a translucent plastic, may act as a waveguide for transmitting light. The use of injection molded plastic as a waveguide has been disclosed in prior applications. Typically, the component may use polycarbonate (PC) or polymethylmethacrylate (PMMA) as the resin of choice that is configured to carry light from the a light source such that the light is visible via the resin portion.

PC material has a number of favorable attributes that make it well suited for this application, such as optical quality and good mechanical properties. However, PC material suffers from poor UV stability and scratch resistance. PMMA material has better UV stability than PC material, but does not perform as well in impact situations. The issues with UV exposure in the case of PC can be overcome with additives in the resin to increase resistance, but such additives increase the cost of the resin and typically add some yellowing to the resin. Scratch resistance can be enhanced with the use of silicone hardcoats, which may also contain UV stabilizers to protect the underlying substrate. However, the application of a hardcoat requires an extra processing step which adds cost to the part.

Accordingly, it is desirable for improvements to be made in the design and construction of decorative automotive components having lighting features.

SUMMARY

This present disclosure solves the above stated limitations of polycarbonate or PMMA materials by incorporating silicone into the construction of the automotive component. More particularly, a silicone portion may be used as a lens through which light is transmitted and made visible to the consumer. In this aspect, silicone acts as a light pipe to distribute light from a light source, such as a LED, laser, etc., to a location separate or remote from the light source.

The silicone lens can be assembled to a common carrier along with a light source and a cover. The cover may be disposed over the silicone lens, such that a portion of the silicone is exposed for light to be visible, and a portion of the lens is covered by the cover where light is not visible.

According to an aspect of the disclosure, in one aspect, a decorative automotive component is provided, comprising: a carrier structure; a light source mounted to the carrier structure; a transparent or translucent light-transmissive lens mounted to the light source; a decorative cover mounted to the lens; wherein the lens disperses light and includes a molded silicone body defining a light guide, wherein light generated by the light source is transmitted through the lens and visible around the decorative cover.

In one aspect, the cover includes an electroplated chrome surface finish.

In one aspect, the cover is opaque.

In one aspect, the lens includes an inner surface and an outer surface, wherein the lens includes a light diffusing roughened surface texture on one or both of the inner surface and the outer surface.

In one aspect, the light diffusing roughened surface texture is in the form of a micro-texture integrally molded into the lens body.

In one aspect, the lens includes a diffusing agent disposed internally within a hardened resin of the lens body.

In one aspect, the lens includes an inner surface and an outer surface, wherein one or both of the inner and outer surfaces have a smooth surface texture.

In one aspect, the lens includes a lower cavity, wherein the light source is received in the lower cavity, wherein the lens includes an upper channel, wherein the cover is received at least partially in the upper channel.

In one aspect, the lens has a greater width than the cover and defines a visible portion of the lens disposed outwardly relative to the cover, through which a visible portion of light from the light source is visible around the cover.

In one aspect, the light source is disposed laterally inward relative to the visible portion of the lens.

In one aspect, the lens completely covers the light source.

In one aspect, the cover partially covers the lens, wherein an uncovered portion of the lens transmits light from the light source.

In one aspect, the lens does not include a protective hardcoat.

In one aspect, the carrier includes a first portion and a second portion, wherein the light source is attached to the first portion of the carrier, wherein the first portion is received in a recess defined by the second portion of the carrier, and the first portion is attached to the second portion.

In one aspect, the lens is formed by reactive injection molding.

In one aspect, the lens is flexible and provides a seal against the carrier, wherein the light source is enclosed between the lens and the carrier.

In another aspect, a method of forming an automotive component having a light-transmissive lens is provided, the method comprising the steps of: producing a silicone lens from a mold, wherein the lens is translucent or transparent and disperses light; attaching the lens over a light source; attaching a cover over a portion of the lens, wherein a visible portion of the lens remains outside of the cover; attaching the lens, light source, and cover to a carrier, wherein light from the light source is transmissible from the light source through the lens and which is visible around the cover.

In one aspect, the step of producing the silicone lens from the mold includes: providing a mold defining a shape of the lens; providing a liquid silicone resin including a first liquid resin and a second liquid resin, wherein the second liquid resin includes a catalyst; providing the liquid silicone resin into the mold, wherein a viscosity of the liquid silicone resin is within a range of 15 k-30 k Pa/sec; heating the mold; activating the catalyst and converting oligomers into a formed solid of the lens.

In one aspect, the mold includes fine-detailed engraving on a surface of the mold, wherein the viscosity of the liquid silicone resin replicates the fine-detailed engraving in a surface finish of the formed solid of the lens, wherein the surface finish of the formed solid of the lens diffuses light passing through the lens.

In one aspect, the method includes providing a diffusing agent in the liquid silicone resin, wherein the lens diffuses light passing through the lens.

BRIEF DESCRIPTION OF THE DRAWINGS

The present disclosure may be further understood with reference to the following detailed description and to the corresponding drawings, in which.

DETAILED DESCRIPTION

Figure 1:
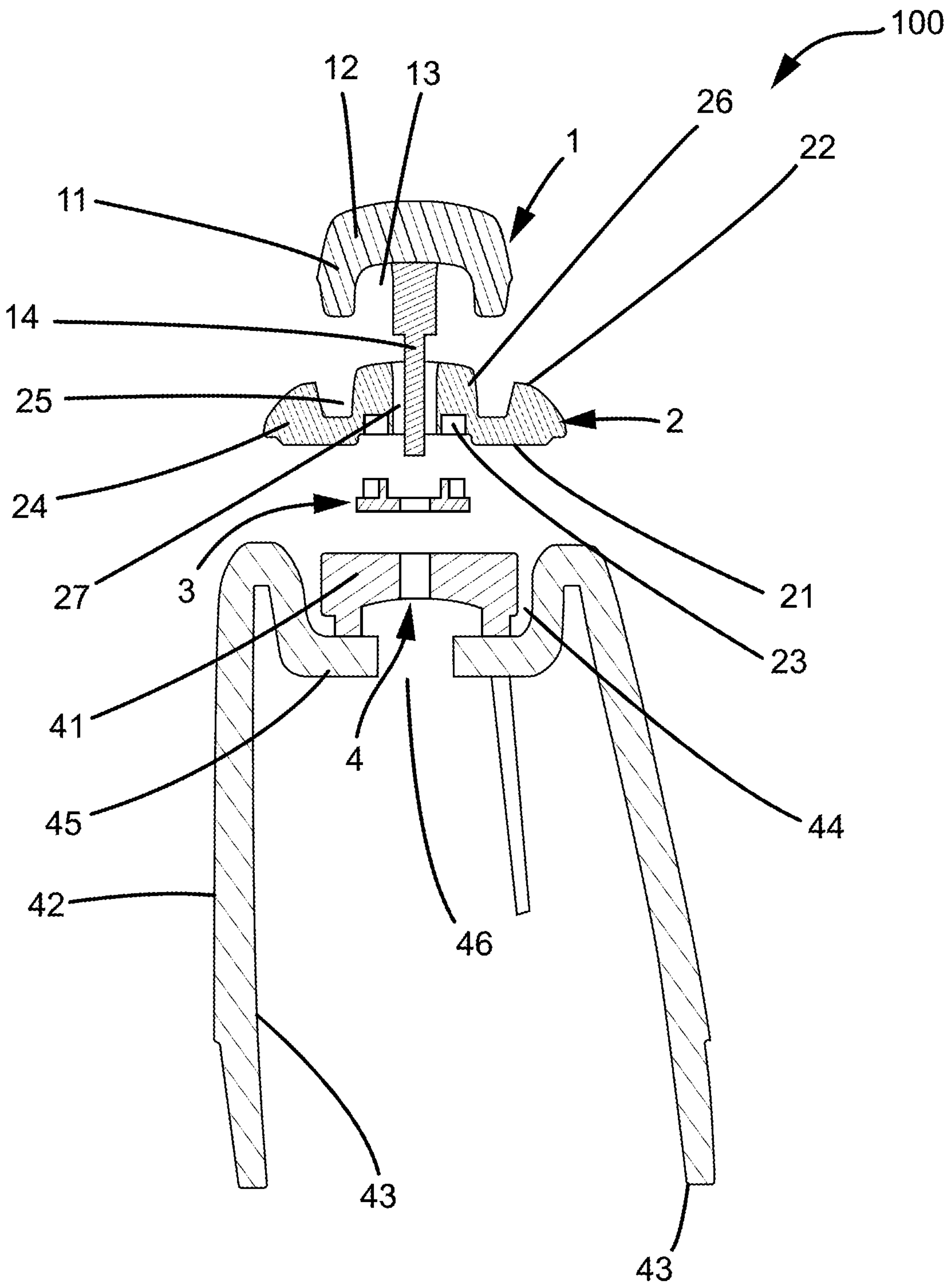
FIG. 1 is a schematic cross-sectional exploded view of an automotive component having a carrier structure, a PCB assembly including an LED for being mounted to the carrier, a silicone lens for being attached over the PCB and LED, and a cover according to an aspect of the disclosure.

With reference now to the Figures, FIG. 1 depicts a cross-section of a decorative exterior automotive component 100 in an exploded view. However, it will be appreciated that the automotive component 100 may also be disposed in interior locations and may have other cross-sectional shapes.

As shown, the component 100 includes a carrier 4 for providing a mounting structure for a LED light source 3, a silicone lens 2, and a decorative cover 1 disposed across the top of the component 100. The lens 2 may also be referred to as an optic lens or optical lens, and is configured to transmit light therethrough and disperse light therefrom. The decorative cover 1 may also be referred to as a cap or a decorative plastic part. The cover 1 may also be made from another material other than plastic. However, the plastic form of the cover may be preferable for cost, ease of assembly, appearance, etc.

In one aspect, the component 100 may be in the form of an elongate roof rail, with the carrier 4, lens 2, and cover 1 having elongate shapes. The light source 3 may be in the form of a plurality of LEDs spaced along the elongate shape of the roof rail, with the spacing provided as desired depending on the desired lighting effect. Alternatively, the light source 3 may be a laser or other light source. Because the lens 2 functions as a light pipe, the light source 3 may be located in select areas while still providing illumination throughout the extent of the lens 2.

It will be appreciated that various embodiments of the present disclosure and of the component 100 are possible.

For example, in one aspect, the decorative cover 1, for example, can contain a number of different finishes, and is not necessarily limited to a decorative chrome finish. The decorative cover 1 may be electroplated chrome, painted, may employ MIC (mold in color), or may utilize other types of finishes, such as decorative film. The finish of the cover 1 may be textured, matte, or glossy. The ultimate finish type may be determined and/or controlled by the process used to create the finish, and the variety of possible specifications used for each process. For example, in an electroplating process, the specifications of the electroplating system may be adjusted or tailored to create different levels of surface roughness and/or smoothness. In another aspect, the finish may be created using post-plating processes such as abrasion. The cover 1 may have multiple finishes, including multiple chrome finishes or appearances, or may be a combination of chrome plating and paint. The cover 1 is sized and shaped to fit together with the lens 2, such that the lens 2 and cover 1 have corresponding mating structures. It will be appreciated that various types of corresponding structures may be used.

With regard to the lens 2, the lens 2 is constructed of a silicone material, rather than a PC or PMMA material. The silicone material used in the lens 2 is naturally UV resistant, and does not require the use of UV absorbing additives as in the use of PC material, thereby providing an improvement relative to PC material. Silicone materials also have excellent thermal and impact properties, thereby providing an improvement relative to PMMA material.

Additionally, silicone materials have a "tuneable" durometer, thereby providing increased flexibility in the design of the overall component 100 and its material and performance properties. For example, the formulation of the silicone material used in the lens 2 can be "tuned" or altered to make the material more flexible (for example, a durometer of approx. 70 Shore A) in cases where some level of surface flexing is required. This relatively softer composition of the material can thereby serve a dual purpose, where the silicone material of the lens 2 can also be used to provide sealing to wire holes and exposed LEDs/PCBs that are disposed adjacent the lens 2, and to reduce NVH (noise, vibration, and harshness) and BSR (buzz, squeak, and rattle). In some instances, isolation gaskets/gimps can be eliminated by combining the gasket/gimp function with the original optical lens 2 component made of the relative softer silicone material described above.

Silicones for the lens 2 can be formed using a RIM process (reactive injection molding) to form the structure and shape of the lens 2. This RIM process uses two liquid components (one of them containing a catalyst) that are metered and injected into a mold cavity. One of the liquid components is a water-like solution, which allows the silicone to reach very tight corners and crevices that other more viscous molten resins cannot reach. In the RIM process, the mold cavity is heated, which heats the solution, and a chemical reaction takes place in the heated cavity, converting the oligomers of the material into a formed solid. In one aspect, the viscosity of the liquid is typically in the 15 k-30 k Pa/sec range. This level of viscosity allows the silicone material to replicate very fine detail engraved on the surface of the mold cavity. The fine detail of the mold, replicated into the molded component, can be used for aesthetic purposes, and can also be used to diffuse or redirect light in a desired manner through the use of engineered surface structures, such as a textured internal or external surface of the lens 2.

With reference again to FIG. 1, the silicone optic lens 2 may be transparent or translucent. Whether transparent or translucent, the lens 2 is configured to be light transmissive and operable as an optical waveguide for light, such that light generated by the underlying LED light source 3 will be transmitted and guided through the structure and shape of the lens 2 and dispersed therefrom. In this aspect, the lens 2 may also be referred to as a light guide. Accordingly, the lens 2 may include one or more surfaces through which light is received (such as the bottom surface of the lens 2 adjacent the light source 3), with the light passing through the body of the lens 2, and thereafter the light is transmitted through one or more surfaces visible to a viewer, such as the upper surface of the lens 2 that is not covered by the cover 1.

Figure 2:
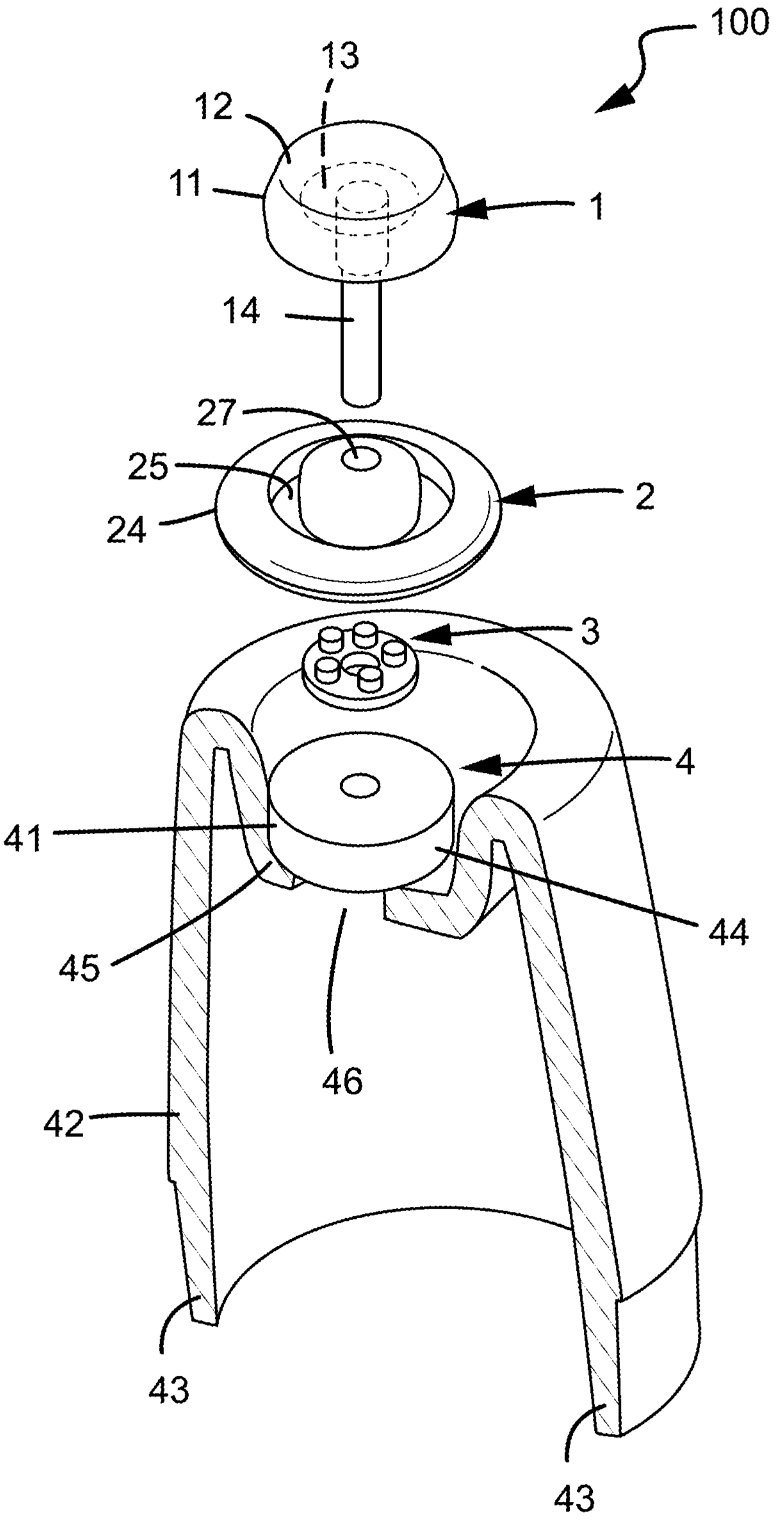
FIG. 2 is a perspective exploded view of the component of FIG. 1.
Figure 3:
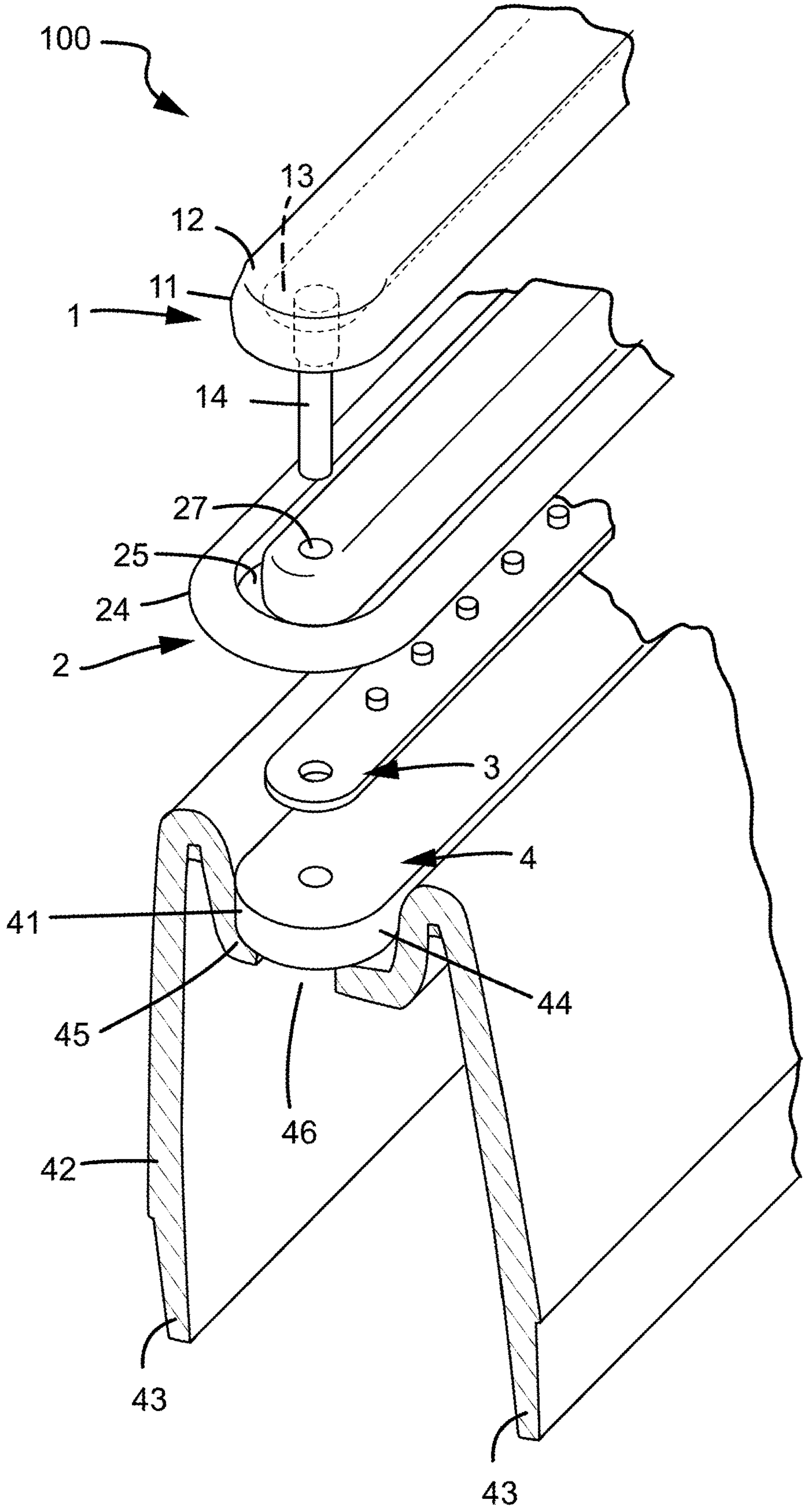
FIG. 3 is a perspective exploded view of another embodiment of a component according to another aspect of the disclosure.

As shown in FIG. 1, a bottom surface 21 (or inner surface) of the lens 2 may be configured to receive light from the light source 3, with an upper surface 22 (or outer surface) configured to the transmit the light from the light source 3. It will be appreciated that the ultimate shape of the lens 2 may vary and that various other surface arrangements or orientations may be provided depending on the arrangement and shape of the automotive component 100 having the lighting feature. For example, as discussed previously, the component 100 may have an elongate shape, with the lens 2 and cover 1 being elongated. In one aspect, the lens 2 may be elongated, as in FIG. 3, and a series of covers 1 may be disposed over select locations of the lens 2. In another aspect, the component 100 may have an annular shape, as in FIG. 2, and the lens 2 may have an annular profile, along with the cover 1 and the carrier 4. It will be appreciated that these alternative shapes are provided for illustrative purposes, and that various shapes of the assembled components are contemplated depending on the type of component being produced.

With reference to the embodiment shown in FIG. 1, the lens 2 includes a lower cavity 23 sized and arranged to include recesses, depressions, or the like that correspond to the projecting shape of the LED components that project from the PCB of the LED light source 3. The cavity 23 may have a width that corresponds to the width of the LED light source 3. Accordingly, the lens 2 is configured to cover, receive, and/or enclose the LED light source 3 therein. The cavity 23 may include the bottom surface 21 that is configured to receive light waves transmitted by the LED light source 3. It will be appreciated that other arrangements and shapes of the light source 3 and/or its PCB may be provided, and the bottom surface 21 and cavity 23 may be sized and configured to receive the various corresponding projections and/or shapes of the lights source 3.

As shown in FIG. 1, the lens 2 may further include lateral or radial projecting side portions 24 as shown in the cross-section of FIG. 1. It will be appreciated that the cross-section of FIG. 1 may be representative of either an elongate or an annular shaped lens 2 and cover 1. For purposes of discussion here, the annular shape of the lens 2 of FIG. 1 will be described.

At the radial outer edge of the lens 2, the lens may include depressions or recesses, such as concave depressions, configured to correspond to the structural shape of the carrier 4 where these edges will mate with the carrier structure. The lens 2, being made of silicone having the flexibility described above, may have sufficient flexibility to provide a sealing function relative to the carrier 4 to protect against the ingress of debris or other contaminants into the carrier structure or into contact with the light source 3. When assembled with the carrier 4, the lens 2 and its outer edge may be pressed into contact and flex slightly to create the seal. In the non-assembled and non-flexed state, the lens 2 and the carrier 4 may have structure that would otherwise interfere, such that the structure at the edge of the lens 2 that is shaped to correspond with the carrier will differ slightly to promote the flexing and sealing force provided by the assembly of the lens 2.

The lens 2 may further include, at its upper surface 22, a channel 25 formed therein that extends downward into the lens body. As shown in FIG. 1, the channel 25 may be annular, and may be disposed generally radially outward relative to the cavity 23 of the bottom surface 21. The channel 25 may be sized and configured to correspond to the shape of the cover 1, in particular a downward projection of the cover 1, such that the cover 1 may be received, at least partially, within the channel 25 and secured thereto. The channel 25 may be defined radially between a radially outer side portion 24 and a central section 26 of the cap.

However, in another aspect, the lens 2 may include other structure at its upper surface 22 configured to correspond to the shape of the cover 1 that will mate with the lens 2. For example, rather than an annular recess/depression/channel, an annular projection may extend up from the lens 2 and be configured to be received in an annular channel on the lower surface of the cover 1. Various other cooperating structures between the cover 1 and the lens 2 may be used.

The channel 25, or other cooperating structure, may have non-annular shapes as well, for instance in the case of an elongate component 100. For example, the channel 25 may have an elongate continuous shape, or may be in the form of a series of channels or other cavities/depressions. Similarly, in the case of an upward projection from the lens 2, the projection may have a continuous elongate shape or a series of elongate shapes. The cover 1 may likewise have corresponding projections or cavities such that the cover 1 and lens 2 may fit together along the interface therebetween.

With reference now to the cover 1, the cover 1 may be sized and configured to include a bottom surface or shape corresponding to that of the upper surface or shape of the lens 2. Accordingly, with reference to the illustrated annular lens 2, the cover 1 may include a radially outer annular projection 11 extending downward from a top portion 12 of the cover 1. The downward outer projection 11 is sized and shaped to correspond to the size and shape of the channel 25 of the lens 2. The outer projection 11 accordingly defines a cavity 13 radially/laterally within. This cavity 13 is sized and shaped to receive the corresponding central projection 26 of the lens 2.

Again, it will be appreciated that the size and shape of the cap 1 and lens 2 may ultimately be arranged differently without departing from the spirit and scope of the present disclosure, and that the described shapes are for discussion purposes. For example, both annular and elongate shapes may be used, and varying corresponding projections and cavities may be used between the cover 1 and the lens 2.

The cover 1 may also include a downwardly projecting pin or post 14, extending downwardly from the top portion 12 and configured to extend through a central portion of the lens 2, the LED light source 3, and the carrier 4. The lens 2 accordingly may include a bore 27 corresponding to the shape of the post 14. The LED light source 3 and carrier 4 may include similar bores/openings/holes, or the like configured to allow passage of the post 14 therethrough.

In one aspect, the post 14 may be threaded at its terminal end to allow for the provision of a nut or other fastener to secure the cover 1 relative to the carrier 4. The post 14 may also include a barbed end or the like configured to provide a snap-fit. In another aspect, the post 14 may have a slightly larger diameter than that of the bore 27 of the flexible lens, thereby creating a frictional retention force on the post 14 when the cover 1 is installed.

The cover 1, according to an aspect of the disclosure, is opaque and configured to block light from being transmitted therethrough, in contrast to the light-transmitting configuration of the lens 2. Thus, the top portion 12 and the projection 11 that are coupled to the lens 2 block the light that is being guided through the lens 2 at this interface between the cover 1 and the lens 2. The cover 1, however, does not fully cover the lens 2. Put another way, the lens 2 includes an outer exposed portion of the upper surface 22, such that light transmitted through the lens 2 acting as a light guide is made visible in these exposed portions to the viewer. The visible portion(s) of the lens 2 are disposed radially outward, in the annular version, relative to the location of the LEDs of the light source 3, such that light is transmitted from the location of the LEDs radially outward, through the outer portion 24 of the lens 2, and to the exposed portion of the upper surface 22.

As illustrated, the LEDs of the light source 3 are disposed below the cover 1, such that the cover 1 overlies the LEDs. The area where the light is visible is laterally adjacent the cover 1. Thus, the light is transmitted outward and provided to a location that is remote from the location of the light source 3. In one aspect, the LEDs may also be disposed radially inward relative to portion 11, such that the LEDs are disposed within the cavity 13 formed in the cover 1. Light from the LEDs will still transmit and propagate through the material of the lens 22 such that light is visible in the radially outer exposed and visible portions of the lens 2.

With reference now to the carrier 4, the carrier 4 is shown in FIG. 1 as having a first portion 41 connected with a second portion 42. The second portion 42 may include a pair of opposed sidewalls 43 that extend upward and then inward to provide a mounting surface for the first portion 41. The first portion 41 may therefore be referred to as an inner portion and the second portion 42 may be referred to as an outer portion. The first portion 41 may have a plate-like structure with a flat upper surface for supporting the PCB of the light source 3.

The second portion 42 may define a cavity 44 recessed below the uppermost surface of the second portion 42, with a flange portion 45 offset and disposed below the uppermost surface. The first portion 41 is received in the cavity 44 and supported by the inwardly extending flange portion 45, with an upper surface of the first portion 41 generally corresponding in height to the uppermost surface of the second portion 42 when the first portion 41 is received in the cavity 44, or the upper surface of the first portion 41 may be slightly recessed below the uppermost surface of the second portion 42. The flange portion 45 may include an opening 46 defined in a central portion thereof and disposed below the first portion 41. The opening 46 may provide access for electrical connections to the LED light source 3 and/or may receive the post 14 of the cap 1. The first portion 41 may also include a central opening through which the post 14 extends.

The carrier 4 may also be in the form of a unitary structure in which the first and second portion 41 and 42 are part of a continuous one-piece structure. The carrier 4 may in the form of injection molded plastic or the like. The carrier 4 is preferably opaque, such that the light from the light source 3 is not visible through the carrier 4, and the light therefore remains limited to the exposed and visible portions of the lens 2. The carrier 4 may have an annular or elongate shape, or other shapes sized and configured to support and retain and light source 3, lens 2, and cover 1 according to the present disclosure.

In one aspect, the carrier 4 may be plated or painted, similar to the cover 1. The carrier may be formed in a manner similar to that which was described in reference to the cover 1.

The carrier 4 may, in one aspect, be in the form of a roof rail. In another aspect the carrier may be a vehicle grille. In another aspect, the carrier may be any other exterior vehicle body trim, or may be an interior decorative trim component. Thus, it will be appreciated that the underlying shape and structure of the carrier 4 may vary depending on the placement and use of the component 100, while still providing the benefits of the aspects of the disclosure described herein.

In one aspect, the component 100 may be provided as a sub-assembly of one of more parts described above. For example, the light source 3 and first portion 41 of the carrier 4 may be assembled together initially, possibly along with the lens 2 and the cover 1, with this sub-assembly thereafter being attachable to the second portion 42 of the carrier 4. It will be appreciated that different sub-assemblies of the component 100 may also be utilized, and may be attached to other shapes of the second portion 42 of the carrier. Alternatively, a given shape of the second portion 42 of the carrier may be provided that can receive alternative constructions of the sub-assembly of the first portion 41, the light source 3, the lens 2, and the cover 1.

Figure 4:
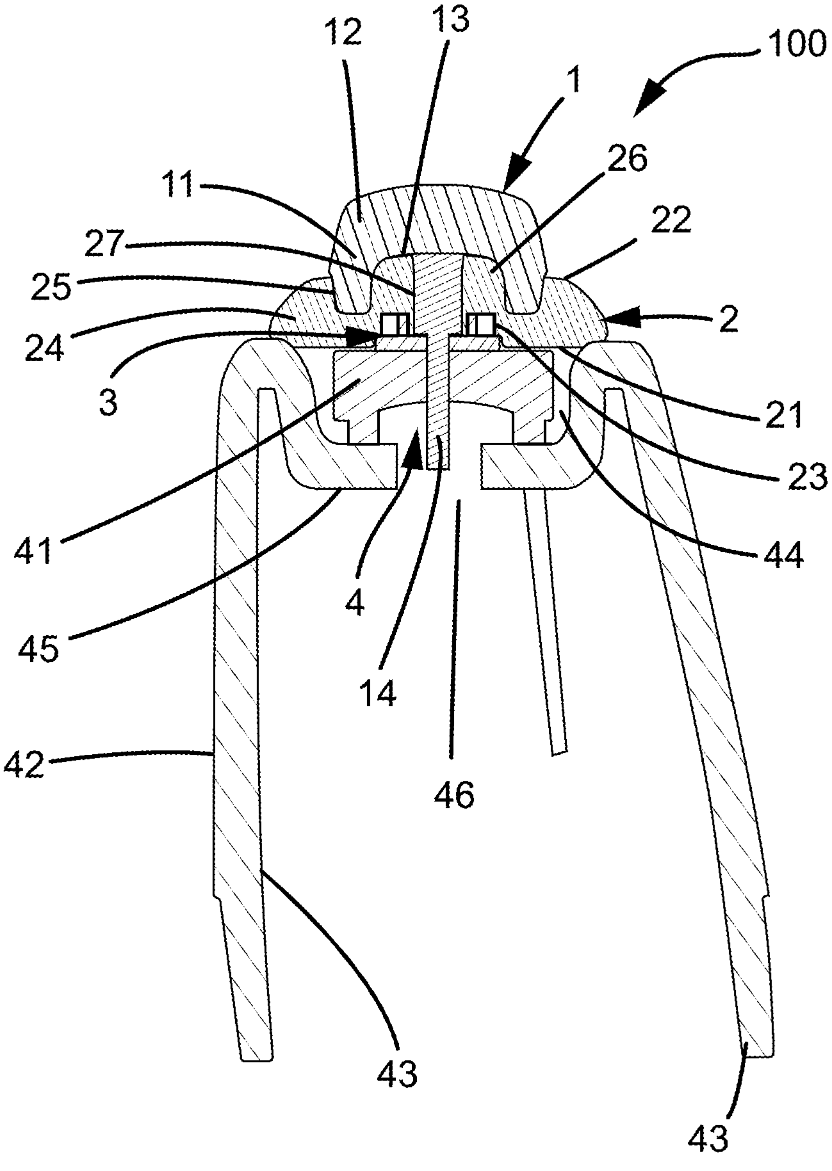
FIG. 4 is an assembled view of the component of FIG. 1.

FIG. 4 illustrates the above-described components in an assembled state, whether using a sub-assembly prior to attachment to the second portion 42 of the carrier 4, or with the components assembled in a different order.

Figure 5A:
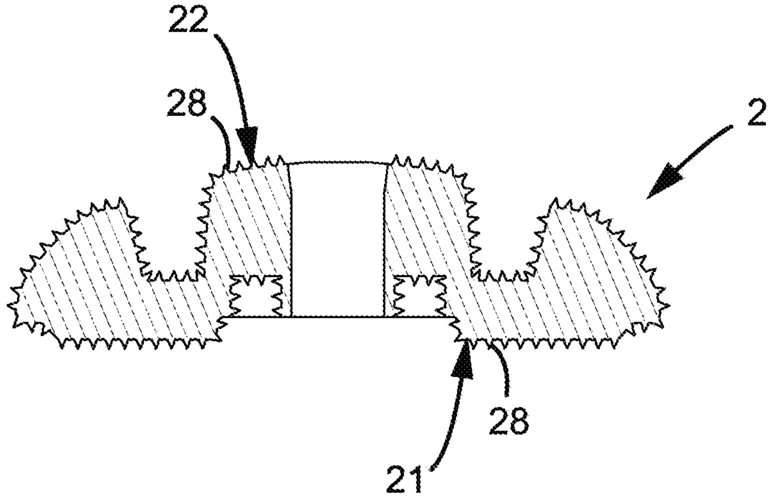
FIG. 5A illustrates the lens having a surface texture.
Figure 5B:
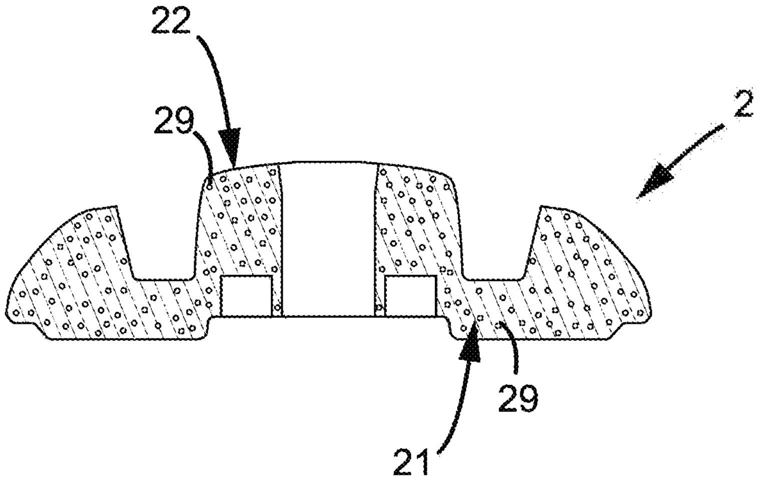
FIG. 5B illustrates the lens having a smooth surface finish and including a diffusing agent within the lens body.

With reference to FIGS. 5A and 5B, the lens 2, via its method of formation described above, can also incorporate texture on a surface thereof (FIG. 5A) (such as via a texture in the mold), with the formed texture providing diffusion, or the lens 2 may have a smooth surface finish (FIG. 5B). In one aspect, the roughened surface texture 28 may be in the form of a molded microtexture, but other forms of roughening may also be used. It will be appreciated that illustrated microtexture is schematic in nature and not to scale. In one aspect both the inner and outer surfaces have the roughened surface texture 28, but it will also be appreciated that one surface may have a roughed surface texture and the other surface may be smooth. It will also be appreciated that portions of the inner and/or outer surface may be roughened while other portions remain smooth. For example, in FIG. 5A, the entire outer surface is shown having the roughened surface finish, but for areas that are going to be covered, such areas may not include the texture, with the portions intended to be visible having the texture. In another aspect, the lens 2 may be formed from a resin that is formulated with a diffusing agent 29 in the bulk resin used in the molding process. The presence of a diffusing agent 29 may be used alone or in combination with a formed texture on the surface on the lens 2 to provide diffusion. Furthermore, the lens 2 may be clear or may be colored with an additive to the resin. Because the silicone has the properties described previously, it does not need the additional step of having a hardcoat on the outer facing side. The lack of a hardcoat reduces the number of steps to provide a light transmissive lens that is UV resistant and suitable for automotive applications, such as exterior automotive trim components.

In view of the above, the component 100 may provide the desirable light-enhanced decorative component for an automobile or other product, and may provide such features without requiring costly UV protective coatings and without sacrificing durability, as in PC and PMMA lenses/materials, and furthermore without sacrificing high-level appearance and fidelity of the light feature that is desirable to consumers.

It will be appreciated that the above description is directed to the illustrated embodiments, but that other forms of the embodiments are within the scope of the present disclosure, and the above description and illustrations shall not be limiting with regard to the scope of the invention set forth in the below claims.

What is claimed is:

1. A decorative automotive component comprising:
- a carrier structure;
- a light source mounted to the carrier structure;
- a transparent or translucent light-transmissive lens mounted to the light source;
- a decorative cover mounted to the lens;
- wherein the lens disperses light and includes a molded silicone body defining a light guide, wherein light generated by the light source is transmitted through the lens and visible around the decorative cover;
- wherein the decorative automotive component is mounted on an exterior of a vehicle and exposed to direct sunlight.

2. The component of claim 1, wherein the cover includes an electroplated chrome surface finish.

3. The component of claim 1, wherein the cover is opaque.

4. The component of claim 1, wherein the lens includes an inner surface and an outer surface, wherein the lens includes a light diffusing roughened surface texture on one or both of the inner surface and the outer surface.

5. The component of claim 4, wherein the light diffusing roughened surface texture is in the form of a micro-texture integrally molded into the lens body.

6. The component of claim 1, wherein the lens includes a diffusing agent disposed internally within a hardened resin of the lens body.

7. The component of claim 1, wherein the lens includes an inner surface and an outer surface, wherein one or both of the inner and outer surfaces have a smooth surface texture.

8. The component of claim 7, wherein the lens completely covers the light source.

9. The component of claim 8, wherein the cover partially covers the lens, wherein an uncovered portion of the lens transmits light from the light source.

10. The component of claim 1, wherein the lens includes a lower cavity, wherein the light source is received in the lower cavity, wherein the lens includes an upper channel, wherein the cover is received at least partially in the upper channel.

11. The component of claim 10, wherein the lens has a greater width than the cover and defines a visible portion of the lens disposed outwardly relative to the cover, through which a visible portion of light from the light source is visible around the cover.

12. The component of claim 11, wherein the light source is disposed laterally inward relative to the visible portion of the lens.

13. The component of claim 1, wherein the carrier includes a first portion and a second portion, wherein the light source is attached to the first portion of the carrier, wherein the first portion is received in a recess defined by the second portion of the carrier, and the first portion is attached to the second portion.

14. The component of claim 1, wherein the lens is formed by reactive injection molding.

15. The component of claim1, wherein the lens is flexible and provides a seal against the carrier, wherein the light source is enclosed between the lens and the carrier.

16. A decorative automotive component comprising:
- a carrier structure;
- a light source mounted to the carrier structure;
- a transparent or translucent light-transmissive lens mounted to the light source;
- a decorative cover mounted to the lens;
- wherein the lens disperses light and includes a molded silicone body defining a light guide, wherein light generated by the light source is transmitted through the lens and visible around the decorative cover
- wherein the lens does not include a protective hardcoat;
- wherein the decorative automotive component is mounted on an exterior of a vehicle and exposed to direct sunlight.

17. The component of claim 16, wherein the component defines a vertical axis, wherein the carrier is disposed below the light source, the light source is disposed below the lens, and the lens is disposed below the cover, wherein the cover, lens, light source, and carrier are in stacked contact and are each contained in a vertical cross-section of the decorative automotive component.

18. A method of forming an automotive component having an optical lens, the method comprising the steps of:
- producing a silicone lens from a mold, wherein the lens is translucent or transparent and light transmissive;
- attaching the lens over a light source;
- attaching a cover over a portion of the lens, wherein a visible portion of the lens remains outside of the cover;
- attaching the lens, light source, and cover to a carrier and forming the automotive component, wherein light from the light source is transmissible form the light source through the lens and which is visible around the cover;
- installing the automotive component on an exterior of a vehicle and exposing the visible portion of the lens to direct sunlight without a hardcoat applied to the lens.

19. The method of claim 18, wherein the step of producing the silicone lens form the mold includes:
- providing a mold defining a shape of the lens;
- providing a liquid silicone resin including a first liquid resin and a second liquid resin, wherein the second liquid resin includes a catalyst;
- providing the liquid silicone resin into the mold, wherein a viscosity of the liquid silicone resin is within a range of 15 k-30 k Pa/sec;
- heating the mold;
- activating the catalyst and converting oligomers into a formed solid of the lens.

20. The method of claim 19, wherein the mold includes fine-detailed engraving on a surface of the mold, wherein the viscosity of the liquid silicone resin replicates the fine-detailed engraving in a surface finish of the formed solid of the lens, wherein the surface finish of the formed solid of the lens diffuses light passing through the lens.

* * * * *